(12) United States Patent
Naccari et al.

(10) Patent No.: US 8,374,425 B2
(45) Date of Patent: Feb. 12, 2013

(54) METHOD OF CHROMATIC CLASSIFICATION OF PIXELS AND METHOD OF ADAPTIVE ENHANCEMENT OF A COLOR IMAGE

(75) Inventors: Filippo Naccari, Tremestieri Etneo (IT); Arcangelo Ranieri Bruna, San Cataldo (IT); Alfio Castorina, Linera (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 1047 days.

(21) Appl. No.: 12/002,619

(22) Filed: Dec. 17, 2007

(65) Prior Publication Data

US 2008/0144946 A1 Jun. 19, 2008

(30) Foreign Application Priority Data

Dec. 19, 2006 (IT) .............................. VA2006A0079

(51) Int. Cl.
*G06K 9/00* (2006.01)
*G06K 9/62* (2006.01)

(52) U.S. Cl. ....................................... 382/165; 382/224

(58) Field of Classification Search .................... 382/165
See application file for complete search history.

(56) References Cited

U.S. PATENT DOCUMENTS

| | | | |
|---|---|---|---|
| 6,081,653 A | 6/2000 | Zandian | |
| 6,271,825 B1* | 8/2001 | Greene et al. .................. | 345/694 |
| 6,459,419 B1* | 10/2002 | Matsubayashi ............... | 345/156 |
| 6,611,618 B1 | 8/2003 | Peli | |
| 6,690,822 B1 | 2/2004 | Chen et al. | |
| 6,721,000 B1 | 4/2004 | Lin et al. | |
| 6,738,510 B2 | 5/2004 | Tsuruoka et al. | |
| 7,336,819 B2 | 2/2008 | Gallagher et al. | |
| 7,528,991 B2 | 5/2009 | Naccari et al. .................. | 358/1.9 |
| 2002/0136450 A1* | 9/2002 | Chen et al. ..................... | 382/165 |
| 2005/0018923 A1* | 1/2005 | Messina et al. ............... | 382/274 |
| 2005/0117173 A1 | 6/2005 | Kugo | |
| 2005/0152582 A1* | 7/2005 | Yoon et al. ..................... | 382/115 |
| 2005/0207643 A1 | 9/2005 | Lee et al. | |
| 2005/0212820 A1* | 9/2005 | Liu et al. ........................ | 345/620 |
| 2005/0286793 A1 | 12/2005 | Izumi et al. | |
| 2006/0029265 A1 | 2/2006 | Kim et al. | |
| 2006/0050957 A1* | 3/2006 | Naccari et al. ................. | 382/165 |
| 2006/0102843 A1 | 5/2006 | Bazakos et al. | |
| 2006/0104517 A1 | 5/2006 | Ko et al. | |

(Continued)

FOREIGN PATENT DOCUMENTS

WO 2005/066896 A2 7/2005
WO 2006/040311 A2 4/2006

OTHER PUBLICATIONS

Battiato et al., "Automatic Global Image Enhancement by Skin Dependent Exposure Correction," Proc. of IEEE-EURASIP Workshop on Nonlinear Signal and Image Processing, Grado, Italy, Jun. 2003.

(Continued)

*Primary Examiner* — David Zarka
(74) *Attorney, Agent, or Firm* — Seed IP Law Group PLLC

(57) ABSTRACT

A method of processing digital images by transforming a set of pixels from a three-dimensional space to a normalized two-dimensional space, determining a membership class and membership class level of each pixel in the set of pixels, and selectively modifying colors of pixels in the set of pixels based on the determined membership classes and membership class levels.

11 Claims, 10 Drawing Sheets
(9 of 10 Drawing Sheet(s) Filed in Color)

U.S. PATENT DOCUMENTS

2008/0144946 A1  6/2008  Naccari et al.

OTHER PUBLICATIONS

Battiato et al., "A Global Enhancement Pipeline for Low-cost Imaging Devices," IEEE Transactions on Consumer Electronics, 49(3):670-675, Aug. 2003.

Chen et al., "Fast skin color detector for face extraction," Proc. of SPIE-IS&T Electronic Imaging, 5671:93-101, 2005.

Comaniciu et al., "Robust Analysis of Feature Spaces: Color Image Segmentation," IEEE Computer Society Conference on Computer Vision and Pattern Recognition, 750-755, 1997.

Kim et al., "Preferred Skin Color Reproduction Based on Adaptive Affine Transform," IEEE Transactions on Consumer Electronics, 51(1):191-197, Feb. 2005.

Lee et al., "Automatic Flesh Tone Reappearance for Color Enhancement in TV," IEEE Transactions on Consumer Electronics, 43(4):1153-1159, Nov. 1997.

Lee et al., "Favorite Color Correction for Reference Color," IEEE Transactions on Consumer Electronics, 44(1):10-15, Feb. 1998.

Martinkauppi et al., "Comparison of skin color detection and tracking methods under varying illumination," Journal of Electronic Imaging, 14(4):043014-1-043014-19, Oct.-Dec. 2005.

Oh et al., "A Real Time Color Correction Circuit Based on 2-Dimensional Chromaticity Region Separation," IEEE Transactions on Consumer Electronics, 43(3):855-862, Aug. 1997.

Yendrikhovskij et al., "Optimizing color reproduction of natural images," The Sixth Color Imaging Conference: Color Science, Systems, and Applications, 140-145, 1998.

Italian patent application VA2004A00032.

\* cited by examiner

METHOD OF CHROMATIC CLASSIFICATION OF PIXELS AND METHOD OF ADAPTIVE ENHANCEMENT OF A COLOR IMAGE

BACKGROUND

1. Technical Field

This disclosure relates to digital image processing and more particularly to a method of chromatic classification of pixels and a method of adaptive enhancement of a color image that uses the method of chromatic classification.

2. Description of the Related Art

The diffusion of cameras, cellular phones and other personal equipment capable of taking pictures is a thrust to devise techniques for enhancing images both in global and semantic terms. See S. Battiato, A. Castorina, M. Guarnera, P. Vivirito, "A Global Enhancement Pipeline for Low-cost Imaging Devices," *IEEE Transactions on Consumer Electronics*, Vol. 49, Issue 3, pp. 670-675 (August 2003), and S. Battiato, A. Bosco, A. Castorina, G. Messina, "Automatic Global Image Enhancement by Skin Dependent Exposure Correction," *Proc. of IEEE-EURASIP Workshop on Nonlinear Signal and Image Processing—NSIP* 2003, Grado, Italy (June 2003).

For pictures of natural scenes, panoramas, portraits and the like, it is normally assumed that human eyes are more sensitive to colors of a restricted number of classes. See S. N. Yendrikhovskij, F. J. J. Blommaert, H. de Ridder, "Optimizing color reproduction of natural images", *Proc. Of Sixth Color Imaging Conference: Color Science, Systems, and Applications*, pp. 140-145 (1998); E. J. Lee, Y. H. Ha, "Favorite Color Correction for Favorite Colors", *IEEE Trans. On Consumer Electronics*, vol. 44, No. 1, pp. 10-15 (February 1998); Do-Hun Kim, Hyun-Chul Do, Sung-II Chien, "Preferred Skin Color Reproduction Based on Adaptive Affine Transform", *IEEE Transactions on Consumer Electronics*, 192 Vol. 51, No. 1 (February 2005); Eung-Joo Lee, Yeong-Ho Ha, "Automatic Flesh Tone Reappearance for Color Enhancement in TV," *IEEE Trans. on Consumer Electronics, Vol.* 43, No. 4, pp. 1153-1159 (November, 1997); U.S. Pat. No. 6,738, 510, "Image Processing Apparatus" (2001).

Studies have demonstrated that the chromatic classes are to which human eyes most sensitive are: complexion or skin, vegetation, sky/sea.

These classes appear to have the most intense impact on the human visual system. Classic global techniques (histogram equalization, contrast enhancing) work without supervision, that is without considering specific peculiarities of the color classes of a picture to be processed. See R. C. Gonzalez, R. E. Woods, "Digital Image Processing", $2^{nd}$ edition, Prentice Hall (2002).

Different solutions known in the art contemplate a color correction. For example (PAINTSHOPPRO software from Jasc Software Inc., www_dot_jasc_dot_com; ICORRECT software from Pictographics Inc., www_dot_picto_dot_com) produce an automatic color enhancement. The first of the two referenced techniques carries out automatic saturation enhancement by correcting the whole image in a same way without implementing any adaptive control. The second technique carries out a manually guided color correction, thus in a semiautomatic mode. Users must indicate target colors for real classes and a global correction on the whole image is carried out, often generating unpleasant color merging artifacts. In both cases, a global correction is carried out on the whole image.

The U.S. Pat. No. 6,738,510 discloses a guided correction procedure based on the color classes of an image.

Other works, such as U.S. Pat. No. 6,721,000, "Adaptive Pixel-level color enhancement for a digital camera" (Apr. 13, 2004), U.S. Pat. No. 6,611,618, "Wide-Band Image Enhancement" (Aug. 26, 2003) and D. Comaniciu, D. Meer, "Robust Analysis of Feature Spaces: Color Image Segmentation", *Proc. IEEE Conf. Computer Vision and Pattern Recognition*, pp. 750-755 (1999), disclose color correction techniques in a general or adaptive fashion.

Techniques of image correction/enhancement according to an adaptive approach, even if potentially very effective, have not gained diffused application because of intrinsic difficulties in adequately filtering the large amount of statistical data retrievable from an image to be processed that may include many details of different colors, without requiring an expensively large amount of computational resources.

BRIEF SUMMARY

In one embodiment, a method of chromatic classification of pixels of a digital image comprises the steps of: transforming the chromatic domain of definition of pixels from a three-dimensional space into a respective two-dimensional normalized space; defining a reference model of classification by analyzing a plurality of images of distinct types of subjects, generating distinct collections of samples with respective coordinates in the normalized two-dimensional space for each of a number of chromatic classes corresponding to real objects/subjects; evaluating for each image pixel to be classified the membership class and the membership level on the basis of said reference model; and wherein said reference model is defined by a parametric membership function continuous on said normalized two-dimensional space for each of said classes, the parameters of which are determined by processing the collection of two-dimensional samples of each of said classes. In one embodiment, the reference model is defined by processing the collection of two-dimensional samples of each of said classes calculating the mean position of clusters of samples on the normalized two-dimensional space, the variance in respect to a principal direction and to the direction orthogonal to it and the slope angle of said principal direction, by means of a principal component analysis technique, thus obtaining an elliptical Gaussian model for each of said classes on said normalized two-dimensional space. In one embodiment, the three-dimensional space is the RGB space and the respective normalized two-dimensional space is the rg space. In one embodiment, in each class a relative membership value is obtained for a current pixel being processed, the maximum membership value being established in function of the respective membership class, and the membership level being determined in function of the maximum quantized value with a certain number (n) of bits. In one embodiment of a hardware implementation, the method comprises the steps of storing in an array values of said reference model in correspondence of pairs of values in the normalized two-dimensional space, and of determining the membership level of each pixel by reading from said look-up table the value corresponding to the pair that represents said pixel in the normalized two-dimensional space. In one embodiment, the method comprises the steps of: verifying whether or not the levels of all the membership functions in correspondence of a neutral axis are smaller than a threshold; and reducing proportionally the variances of membership functions for which the verification of the previous step is not satisfied, such that the respective value of the membership level of said neutral axis be smaller than said threshold.

In one embodiment, the threshold is 2%. In one embodiment, the stored values in said two-dimensional array are obtained by said plurality of images through the steps of: on clusters of samples of said images of distinct types of subjects, calculating the mean position, the variance in respect to a principal direction, the variance in respect to the direction orthogonal to it and the slope angle of the principal direction; generating values according to said elliptical Gaussian model in the normalized two-dimensional space; and undersampling and quantizing the values obtained at the previous point and storing them in said two-dimensional array.

In one embodiment, an adaptive method of improving a color image comprises: generating a membership image of the pixels of the color image with pre-established chromatic classes; defining a table of chromaticity target values for each chromatic class of objects; converting definition values of each pixel of an image to be processed from the chromatic definition domain to the respective normalized two-dimensional space; calculating for each cluster of pixel belonging to a certain chromatic class a pair of statistic parameters; calculating for each cluster the distance from the respective chromaticity target value; determining for each pixel of the image belonging to a certain chromatic class, respective values in the chromatic definition domain corrected in function of the coordinates of the original values in the respective normalized two-dimensional space and of the distance of the relative cluster from the relative target color; and carrying out a modulated correction of the color of the pixel by means of a weighted linear combination of the values of the pixel and of said triplet of target values. In one embodiment, the weighted linear combination is carried out using weights determined in function of the membership levels obtained by the classification operation such that the intensity of the pixels of the enhanced image are equal to the intensity of the corresponding pixel of the image to be enhanced.

In one embodiment, a system comprises means for transforming a chromatic domain representation of a pixel from a three-dimensional space to a two-dimensional normalized space; means for determining a membership class of the pixel in a set of membership classes and a corresponding membership class level of the pixel in the determined membership class based on the transformed representation of the pixel; and means for selectively modifying a color of the pixel based on the determined membership class and membership class level of the pixel. In one embodiment, the means for determining is configured to determine a membership class level for the pixel in each class in the set of membership classes and the determined membership class is the membership class in the set of membership classes with a highest determined membership class level. In one embodiment, each class in the set of membership classes is based on a parametric class-membership function that is continuous on the two-dimensional normalized space. In one embodiment, the means for determining comprises a look-up table. In one embodiment, the means for determining is configured to apply a Gaussian function to the transformed representation of the pixel. In one embodiment, the system further comprises an image preprocessor.

In one embodiment a chromatic classification device comprises: a domain transform module configured to transform pixels in a digital image from a three-dimensional space to a two-dimensional normalized space; and a classification module coupled to the domain transform module and configured to output an indication of membership classes and membership class levels associated with respective pixels in the digital image. In one embodiment, the classification module comprises a Gaussian function generator. In one embodiment, the classification module is configured to generate the indication using a look-up table. In one embodiment, the classification module is configured to output a first signal indicative of a membership class associated with respective pixels and a second signal indicative of a membership class level associated with respective pixels and the indication comprises the first signal and the second signal.

In one embodiment, a computer-readable medium comprises program code that causes a computing device to implement a method that includes: transforming a chromatic domain representation of a pixel from a three-dimensional space to a two-dimensional normalized space; determining a membership class of the pixel in a set of membership classes and a corresponding membership class level of the pixel in the determined membership class based on the transformed representation of the pixel; and selectively modifying a color of the pixel based on the determined membership class and membership class level of the pixel. In one embodiment, the program code causes the processor to determine a membership class level for the pixel in each class in the set of membership classes and to determine the determined membership class by selecting a membership class in the set of membership classes with a highest determined membership class level.

In one embodiment, a method of processing pixels in a digital image comprises: generating a membership image of pixels of the digital image based on chromatic classes of a reference model and membership levels of pixels of the digital image in the chromatic classes of the reference model; defining a table of chromaticity target values for each chromatic class; calculating for each cluster of pixels belonging to a chromatic class a pair of statistic parameters; calculating for each cluster a distance from a respective chromaticity target value; determining for each pixel of the image belonging to a respective chromatic class, respective values in the chromatic definition domain corrected in function of coordinates of original values in the respective normalized two-dimensional space and of the distance of the relative cluster from a relative target color; and carrying out a modulated correction of a color of the pixel using a weighted linear combination of the values of the pixel and of said triplet of target values. In one embodiment, the weighted linear combination is carried out using weights determined in function of the membership levels such that an intensity of pixels of the enhanced image is equal to an intensity of the corresponding pixel of the image to be enhanced.

In one embodiment, a method of processing digital images comprises transforming a set of pixels from a three-dimensional space to a normalized two-dimensional space, determining a membership class and membership class level of each pixel in the set of pixels, and selectively modifying colors of pixels in the set of pixels based on the determined membership classes and membership class levels.

BRIEF DESCRIPTION OF THE SEVERAL VIEWS OF THE DRAWINGS

The patent or application file contains at least one drawing executed in color. Copies of the patent or patent application publication with color drawings will be provided by the Office upon request and payment of the necessary fee.

This invention will be described referring to the attached drawings, wherein.

FIGS. from 7a to 7d depict two sample captured images (7a and 7c) and the corresponding pixel classification images (7b and 7d) of an embodiment.

Figure 8:
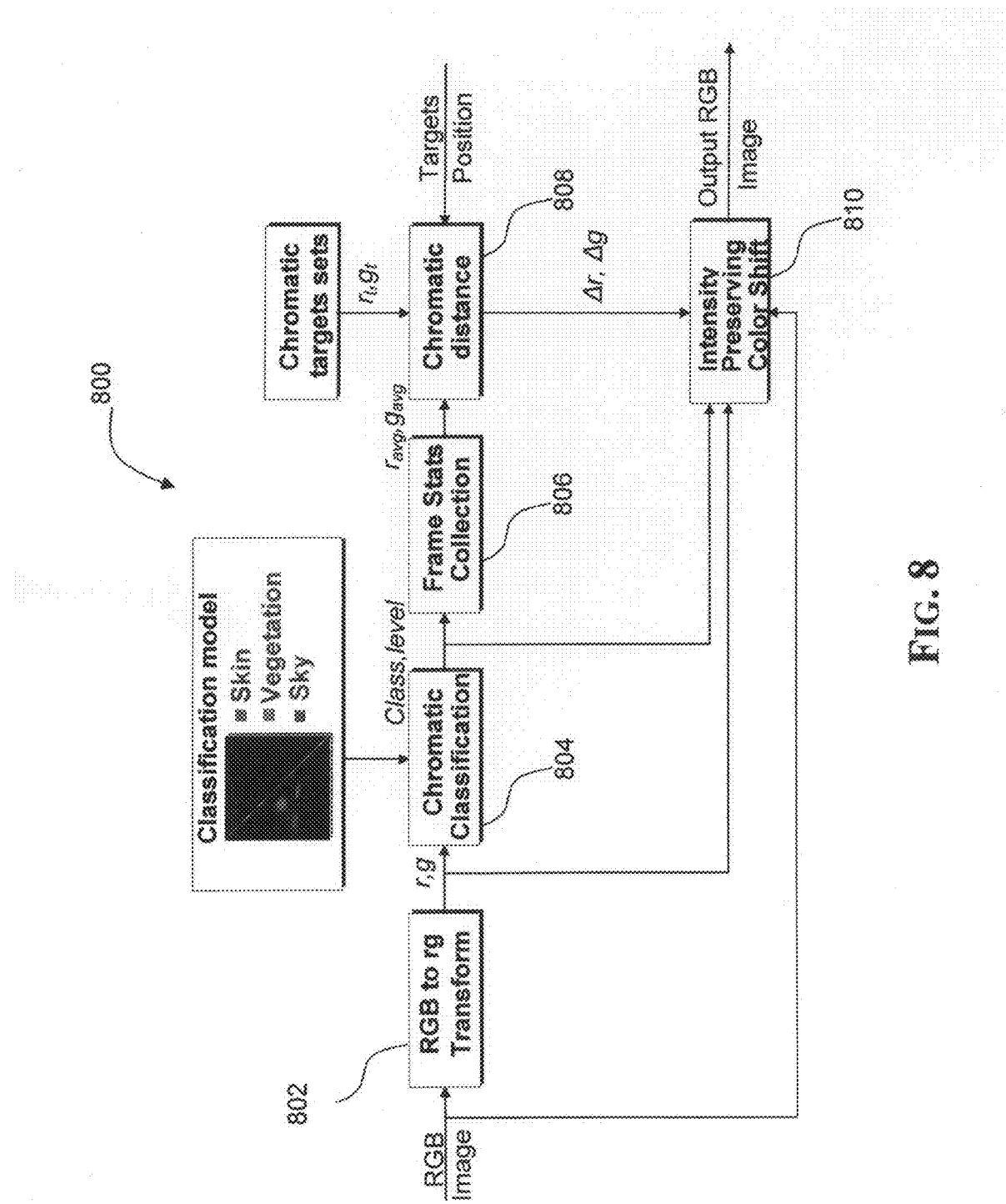

FIG. 8 is a flow chart that illustrates an embodiment of a method of color enhancement of a digital image.

Figure 9:
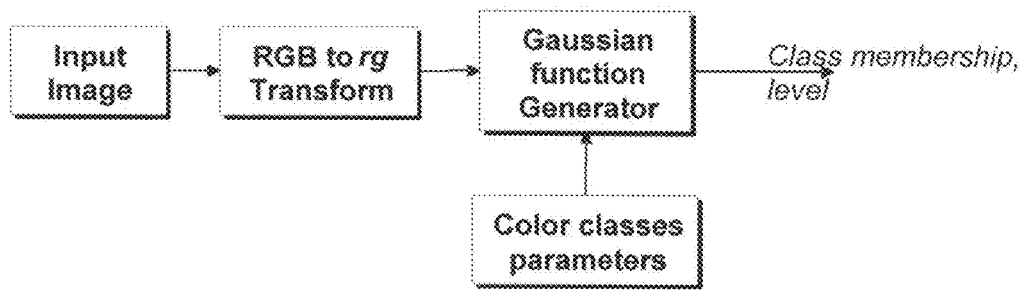

FIG. 9 depicts a block diagram of an embodiment of a classification method.

Figure 10:
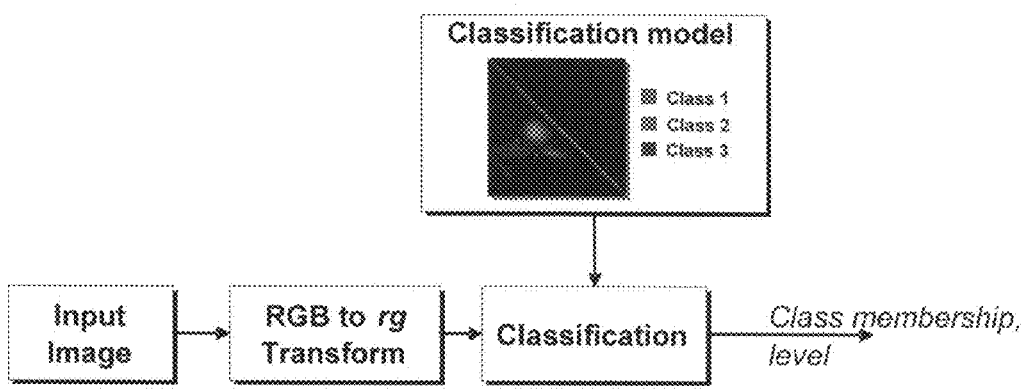

FIG. 10 depicts another embodiment of a classification method.

Figure 11:
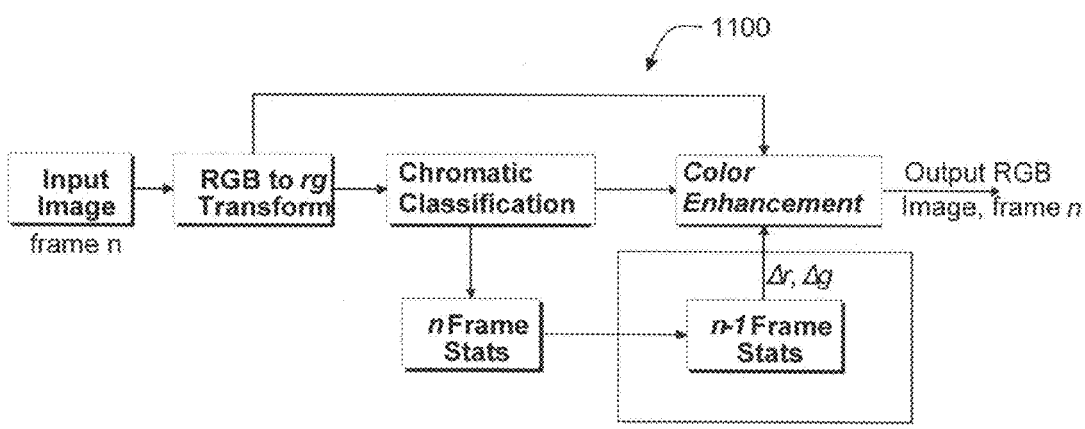

FIG. 11 depicts a flow-chart of an embodiment of a method of color enhancement of a picture of a video sequence.

Figure 12:
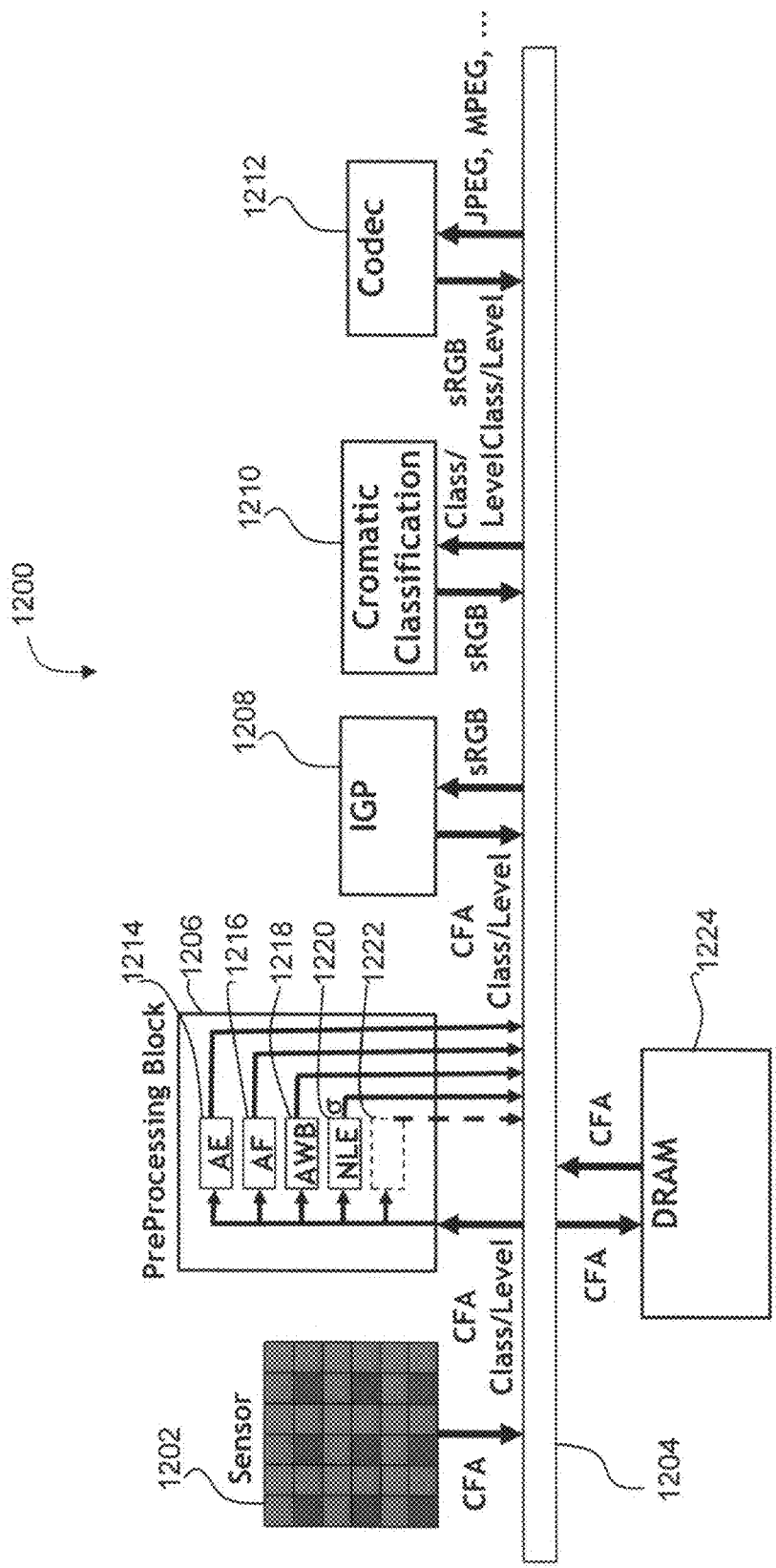

FIG. 12 depicts the main blocks of an embodiment of a digital photo-camera that has a block that implements embodiments of classification methods.

FIGS. from 13a to 13h depict two images to be processed (13a and 13e), the same images with enhanced colors using pale target colors (13b and 13f), the same images with enhanced colors using an intermediate color saturation targets (13c and 13g) and using high saturation color targets (13d and 13h).

Figure 13A:
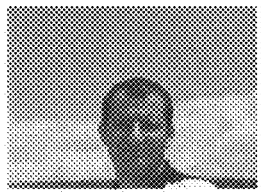
Figure 13B:
Figure 13C:
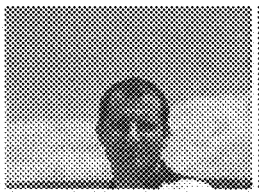
Figure 13D:
Figure 13E:
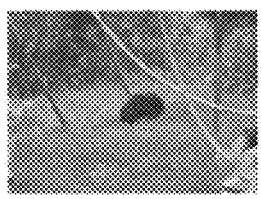
Figure 13F:
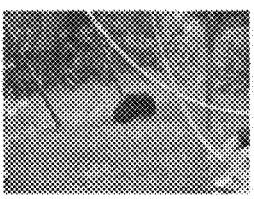
Figure 13G:
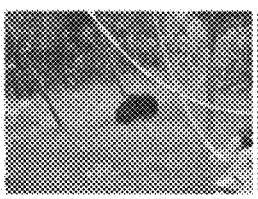
Figure 13H:
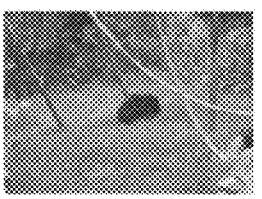
Figure 14A:
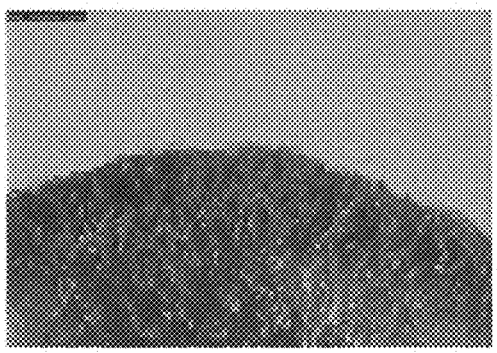
Figure 14B:
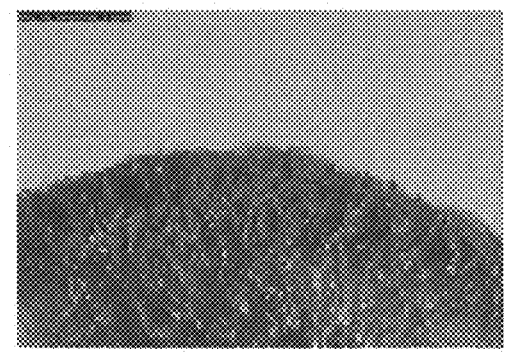
Figure 14C:
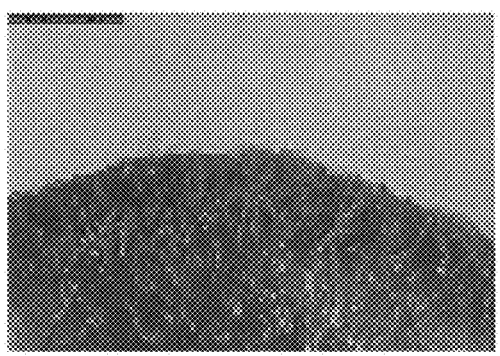
Figure 14D:
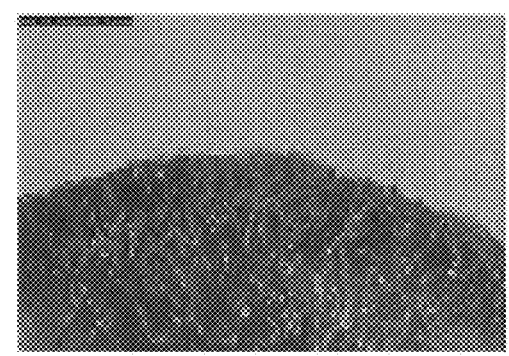

FIGS. from 14a to 14d depict (14a) a detail of the image of FIG. 13a and the enhanced replicas thereof using chromatic targets with pale tones (14b), targets with intermediate statistics (14c) and with high color saturation levels (14d).

DETAILED DESCRIPTION

Hereinafter reference will be made to pixels represented in the RGB domain, because this is the most commonly used representation space in photo-cameras and in digital video-cameras, though the same considerations apply, mutatis mutandis, for pixels represented in different spaces of luminance and chrominance (HSL, HSI, La*b*, Lu'v', YCbCr and the like), such as those mentioned in R. C. Gonzalez, R. E. Woods, "Digital Image Processing", 2$^{nd}$ edition, Prentice Hall (2002).

One method that addresses some of the above-mentioned drawbacks is disclosed in prior patent application U.S. 2006/0050957 in the name of the same applicant, and it is essentially based on the definition of a membership mask of input image pixels to one or proportionally to several classes of a plurality of pre-established classes of basic colors or hues of certain real objects, for example complexion or skin, vegetation, sky/sea, . . . , and the like, through a fully automatic processing and based on the definition of a look-up table of target colors for each of the classes to which each pixel of the input image is recognized as belonging.

Any number of chromaticity classes may be pre-established, depending on the type of the input images or of certain needs of the application of correcting/enhancing colors or even of other applications.

Many authors proposed techniques for detecting specific classes of objects, such as skin, vegetation and sky in digital images. These approaches are all based on chromatic models extracted from image collections and adopt different classification schemes according to various aspect and lighting models. See Lihui Chen, Christos Grecos, "Fast skin color detector for face extraction", Proc. of SPIE-IS&T Electronic Imaging, SPIE Vol. 5671 (2005); B. Martinkauppi, M. Soriano, M. Pietikätinen, "Comparison of skin color detection and tracking methods under varying illumination", Journal of Electronic Imaging, vol. 14(4) (2005); S. N. Yendrikhovskij, F. J. J. Blommaert, H. de Ridder, "Optimizing color reproduction of natural images", Proc. Of Sixth Color Imaging Conference: Color Science, Systems, and Applications, pp. 140-145 (1998); E. J. Lee, Y. H. Ha, "Favorite Color Correction for Favorite Colors", IEEE Trans. On Consumer Electronics, vol. 44, No. 1, pp. 10-15 (February 1998). Automatic classification may be used for enhancing colors of digital images. See E. J. Lee, Y. H. Ha, "Favorite Color Correction for Favorite Colors", IEEE Trans. On Consumer Electronics, vol. 44, No. 1, pp. 10-15 (February 1998); Do-Hun Kim, Hyun-Chul Do, Sung-II Chien, "Preferred Skin Color Reproduction Based on Adaptive Affine Transform", IEEE Transactions on Consumer Electronics, 192 Vol. 51, No. 1 (February 2005); Eung-Joo Lee, Yeong-Ho Ha, "Automatic Flesh Tone Reappearance for Color Enhancement in TV," IEEE Trans. on Consumer Electronics, Vol. 43, No. 4, pp. 1153-1159 (November, 1997); C. G. Oh, S. D. Lee, C. Y. Kim, et al. "A Real Time Color Correction Circuit Based on a 2D Chromaticity Region Separation". IEEE Transaction on Consumer Electronics, Vol. 43, No. 3, pp. 855-862 (August 1997).

Various patents and patent applications that disclose techniques of chromatic classification and color correction of a digital image are available in the literature. See U.S. Pat. No. 6,690,822, "Method for detecting skin color in a digital image" (Feb. 10, 2004); Int. Patent Application WO2005/066896, "Detection of Sky in digital color images" (Jul. 21, 2005); U.S. Patent Application US2005/0207643, "Human skin tone detection in YCbCr work space" (Sep. 22, 2005); U.S. Patent Application US2005117173A1, "Image processing and method for Red Eye correction" (Jun. 2, 2005); U.S. Patent Application US2005152582A1, "Multiple Person detection apparatus and method" (Jul. 14, 2005); U.S. Patent Application US2005286793A1, "Photographic Image Processing Method and Equipment" (Dec. 29, 2005); U.S. Patent Application US2006029265A1, "Face Detection Method based on Skin Color and Pattern Match" (Feb. 9, 2006); Int. Patent Application WO2006/040311A1, "Method for detecting Skin Tone Pixels" (Apr. 20, 2006); U.S. Patent Application Publication US2006102843A1, "Infrared and Visible Fusion Face Recognition System" (May 18, 2006); U.S. Patent Application Publication US2006104517A1, "Template-Based Face Detection Method" (May 18, 2006); U.S. Pat. No. 6,721,000, "Adaptive Pixel-level color enhancement for a digital camera" (Apr. 13, 2004); U.S. Pat. No. 6,611,618, "Wide-Band Image Enhancement" (Aug. 26, 2003); U.S. Pat. No. 6,081,653, "Color Imaging" (Jun. 27, 2000).

Tests carried out by the Applicant showed that by using the method of classification disclosed in IT Patent, IT NP VA2004A00032, "Algorithm and architecture for automatic color rendition" (Aug. 31, 2004), in color enhancement algorithms of certain images, artificial borders with abrupt instead of smooth color variations appears in the processed images. This phenomenon is particularly enhanced when digital images with smooth colors are processed, such as for example a picture of a misty scene, and the like. Moreover, the method disclosed in IT Patent NP VA2004A00032 is applicable only if pixels are represented in the hue/saturation domain for establishing easily appropriate color discrimination thresholds. Generally, digital photo-cameras generate images in the RGB domain. Thus, for applying the method disclosed in IT Patent, IT NP VA2004A00032, it is necessary to convert RGB values of the pixels of a captured image in corresponding values in the hue/saturation domain, a process that requires burdensome calculations.

A method of pixel classification of digital pixels that could be used for enhancing images with smoothed colors without generating artificial borders and that possibly be easily and effectively usable whichever the pixel representation domain is (RGB, HSL, HSI, La*b*, Lu'v', YCbCr and the like), would be desirable.

Investigations carried out by the Applicant lead to consider that artificial borders may be generated by known methods of processing images. Pixels of an image to be processed according to known methods are judged as belonging to a certain class instead of another class or not belonging to any class, depending on comparisons with pre-established thresholds. In the presence of smooth color variations, even a small hue variation makes certain pixels subject to be recognized as belonging to a class whilst adjacent pixels, even if only slightly different from them, recognized as not belonging to any pre-established class. As a consequence, the color of the former pixels is corrected in a substantially different manner from other nearby pixels, thus generating artificial borders due to the fact that a relative smoothness of the color charges in the original scene gives rise to an unbecoming stepwise color representation in the processed image.

According to an embodiment, the problem is effectively solved by defining for each class a respective membership function continuous on the whole definition space of image pixels that decreases when the distance of the considered pixels from color values that are statistically most probable for the considered class increases. Therefore, by using such membership functions, to each pixel of an image to be processed is attributed a membership level to each class and the membership class of the pixel being processed is determined to be that corresponding to the highest membership level.

According to an embodiment, the membership function is an elliptic Gaussian function. Repeated tests carried out by the Applicant using different continuous membership functions, showed that this function is particularly suitable for grouping pixels of sky/sea, vegetation and skin in any domain (RGB, HSL, HSI, La*b*, Lu'v', YCbCr and the like) they are represented. Other continuous membership functions may be satisfactorily used, such as a conical function or a Gaussian function.

According to an embodiment of a method of color enhancement of pixels of an image, once the membership class and the relative membership level are determined for each pixel, the information is used for deciding toward which values and how much the color of each pixel is to be corrected. In practice, a table of target chrominance values may be defined for each chromatic class of the real objects of the scene and the color of each pixel of the acquired image corrected in function of its membership level to a certain chromatic class of objects and in function of the target chromaticity values for that class.

According to an embodiment of a method of color enhancement of image pixels, the color of each pixel is corrected to a value calculated using a weighted mean of the current color values and of the target color values of its class, wherein the weight is its membership level. Embodiments of this technique proved useful in preventing generation of artificial borders. Indeed, all pixels may be classified and images with nuances of colors of pixels of a same class gradually corrected, because their membership level varies continuously. Moreover, even if with an embodiment of the classification method in a class (skin, vegetation, sky/sea) may be included pixels that do not represent objects of that class, perceivable artifacts in the enhanced image may be avoided. Indeed, the membership level of these pixels may be so small that the color of the corresponding pixels generated by the color enhancement step will substantially remain the same.

Embodiments may be particularly advantageous for processing pixels of RGB images. The discrimination among classes of pixels may be carried out without transforming pixels from the RGB space to that of complementary hues, but simply by converting each color pixel from the RGB space in a corresponding normalized two-dimensional space rg and by evaluating the membership level of each pixel to each class of objects, preferably by using the elliptical Gaussian membership function. With this technique it is not necessary to carry out onerous calculations for transforming the RGB triplet of each pixel in the space of complementary hues, though obtaining very satisfactory results.

Embodiments of the methods may be implemented, for example, by software executed by a computer or by a microprocessor or by means of a dedicated hardware or by combinations thereof.

Figure 1:
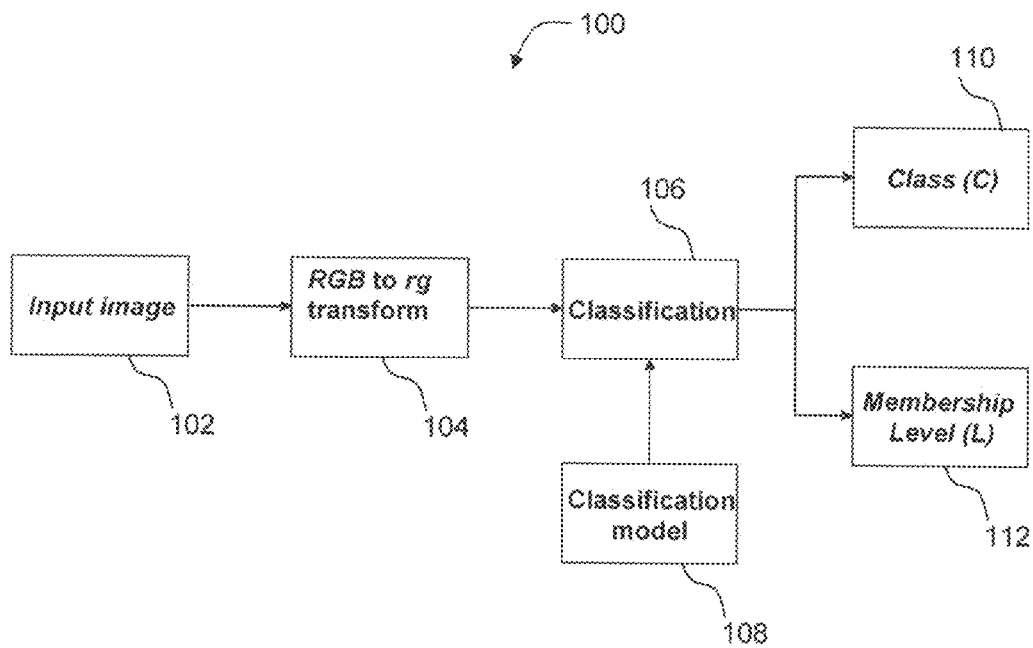
FIG. 1 shows a block diagram that schematically illustrates the chromatic classification method of an embodiment.

A block diagram that illustrates a chromatic classification method 100 of an embodiment is depicted in FIG. 1. The block diagram of FIG. 1 also illustrates function blocks of an embodiment of a system 100 for chromatic classification. Each pixel of the input image 102, in the RGB chromatic domain, is converted 104 to the rg normalized chromatic domain according to the following equations:

$$r = \frac{R}{R+G+B} \quad (1)$$

$$g = \frac{G}{R+G+B} \quad (2)$$

Hereinafter, it will be shown that it is possible to obtain an accurate classification even in the normalized rg chromatic domain. It is very easy to carry out the transformation described by equations (1) and (2) starting from the components of the pixel in the RGB domain.

The classification block CLASSIFICATION 106 classifies the pixels according to a model CLASSIFICATION MODEL 108 that will be described hereinafter. Through the classification step, the chromatic membership class C 110 and the membership level L 112 to this class of each pixel are determined.

An effective automatic classification model may defined by a statistical characterization of the desired classes. One such characterization was obtained by examining a large number of images that represent objects/subjects of the chromatic classes that are to be identified, chosen in a database composed of about 500 high quality RGB images with 16.7 millions of possible colors (24 bits per pixel), judged by a panel of observers as high quality color images. This means that images with colors that appeared unnatural or anomalous (according to a common perception by the judges) were discarded.

The images were segmented by means of an appropriate algorithm to avoid collecting statistics of excessively spread out color samples. This operation was carried out using the algorithm disclosed in D. Comaniciu, D. Meer, "Robust Analysis of Feature Spaces: Color Image Segmentation", *Proc. IEEE Conf. Computer Vision and Pattern Recognition*, pp. 750-755, 199, that is effective in drastically reducing the number of colors of an image according to semantic principles, but various known alternative approaches may be used for the same purpose.

Figures 2A, 2B:
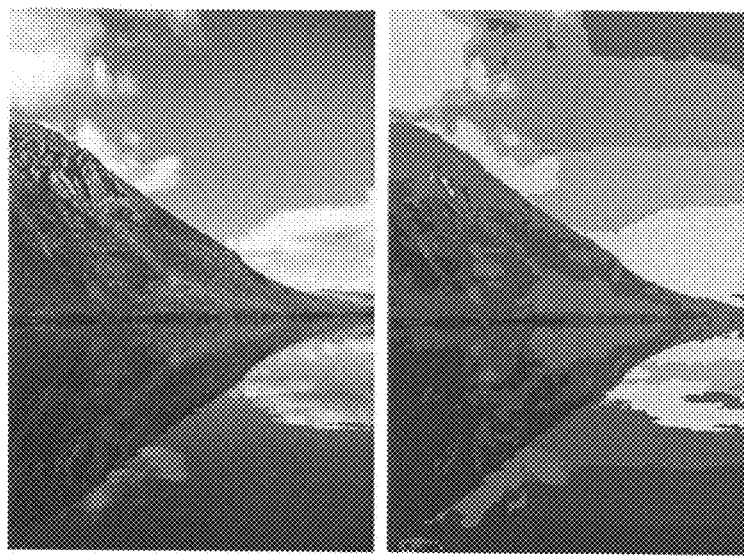
FIGS. 2a and 2b depict a 32646 color image and the same image quantized with 11 colors, respectively.

FIGS. 2A and 2B depict an embodiment of a color quantization method used for reducing the number of different colors represented in the picture. In the shown example, the image of a panorama composed of 32646 different colors (FIG. 2A) has been converted in an 11 color image (FIG. 2B) for reducing calculation time.

The color of uniform regions, perceived as representative of each chromatic class to be enhanced, was sampled for extracting a statistical model. Statistic figures for the collected samples of the various chromatic classes under test were calculated in a rg chromatic space.

Figure 3A:
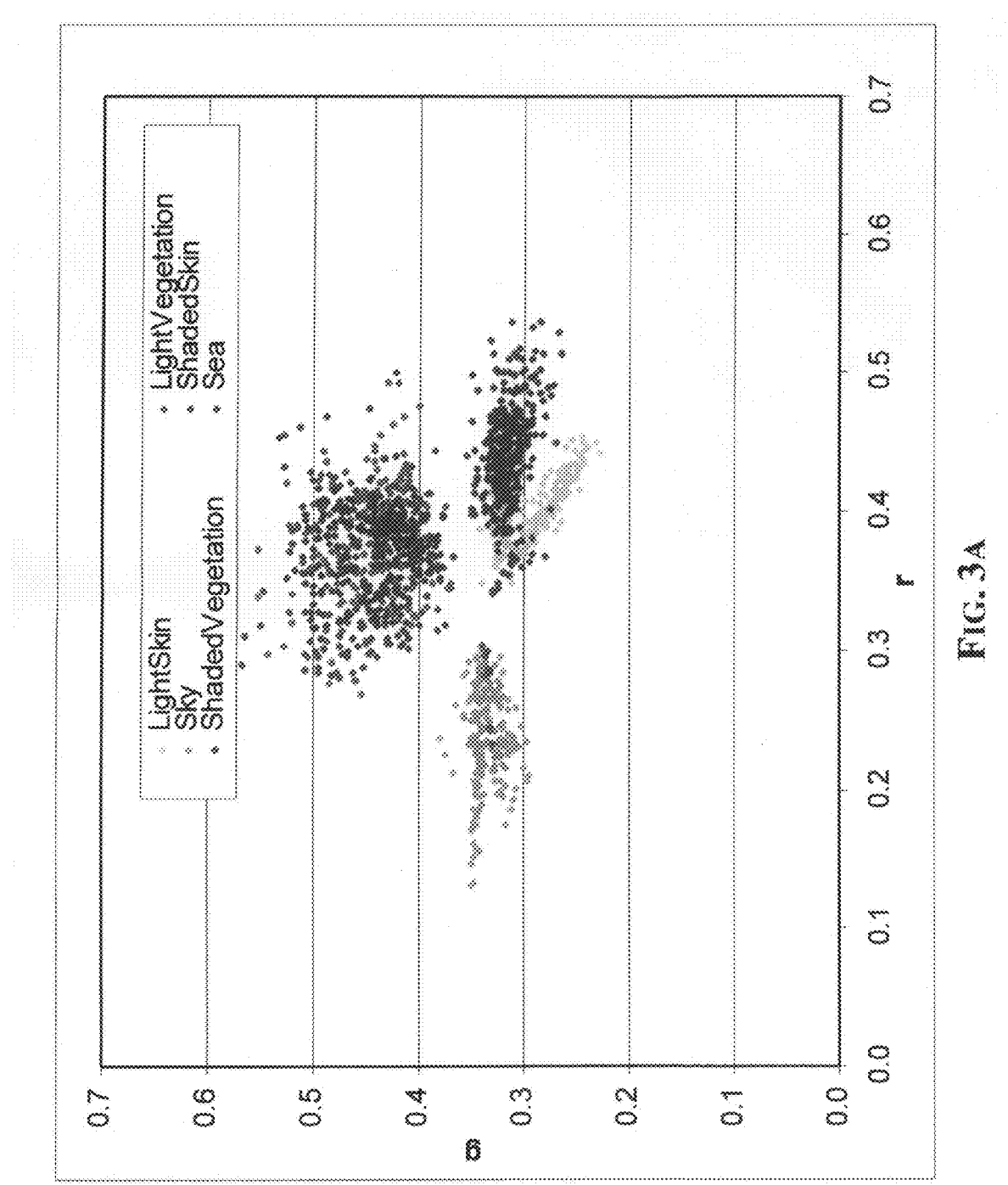
FIGS. 3a and 3b are graphical representation in the rg and in the HS domain, respectively, of objects taken from images of a reference database.
Figure 3B:
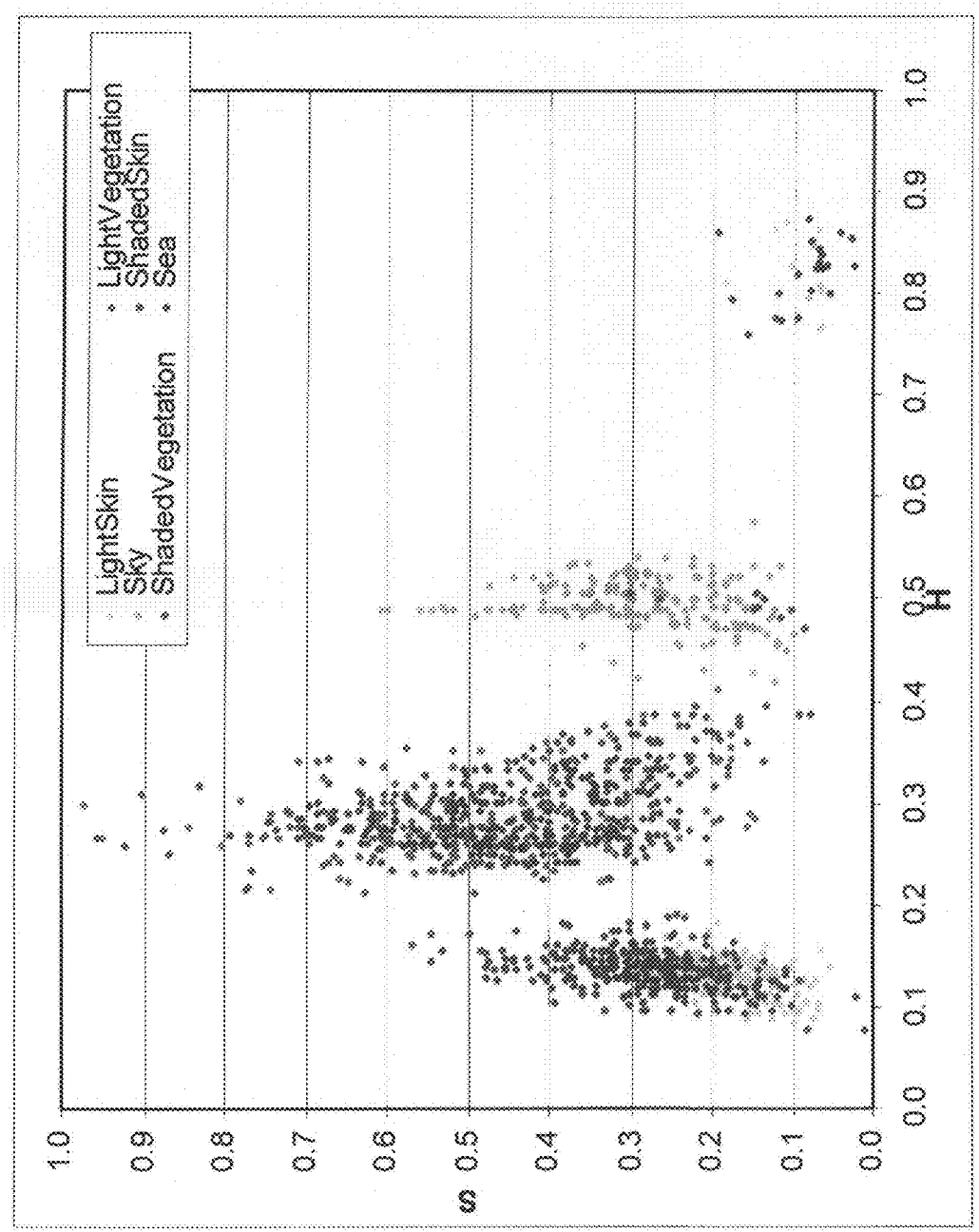

FIGS. 3A and 3B show results obtained for a group of chromatic classes: sky, sea, pale skin, dark skin, lighted vegetation, vegetation in the shade, represented in the rg color space using equations (1) and (2), described above and in the HS space.

According to an embodiment, the membership level of each pixel to a chromatic class is evaluated by using a continuous membership function. Among the numerous possible membership functions, an elliptic Gaussian function has been chosen, generated with the method of Principal Component Analysis (PCA) discussed in R. C. Gonzalez, R. E. Woods, "Digital Image Processing", $2^{nd}$ edition, Prentice Hall (2002), because it is particularly suitable for grouping pixels of a same class whichever the domain in which they are represented. Therefore, for each chromatic class represented as a collection of two-dimensional samples, the mean position of the cluster, the variance along the principal direction and along the orthogonal direction and the slope of the main direction in respect to the system of coordinate axes are calculated.

The elliptic Gaussian function is defined as follows:

$$G_c(r, g) = e^{\left\{\frac{-[(r-r_t)\cos\alpha-(g-g_t)\sin\alpha]^2}{2\sigma_r^2}\right\}\left\{\frac{-[(r-r_t)\sin\alpha+(g-g_t)\cos\alpha]^2}{2\sigma_g^2}\right\}} \quad (3)$$

wherein $\sigma_r$ and $\sigma_g$ are the standard deviations along the principal axis, $r_t$ and $g_t$ are the averages of coordinates of collected samples for a certain chromaticity class C, and $\alpha$ identifies the direction of the principal axis.

The classification operation may be carried out in other different chromatic spaces. For example, if the pixels of the image to be processed are in the space HSL or HSI (or La*b*, Lu'v', YCbCr), they may be conveniently transformed in the respective normalized two-dimensional space HS (or a*b*, u'v', Cb,Cr) and appropriate elliptical Gaussian functions or alternative continuous functions may be defined on this two-dimensional space for establishing the membership level of each pixel to each class. In such a case, the variables of the Gaussian function or of an alternative function will not be the components r and g, but the related components (HS or a*b*, u'v', Cb,Cr).

Figure 4:
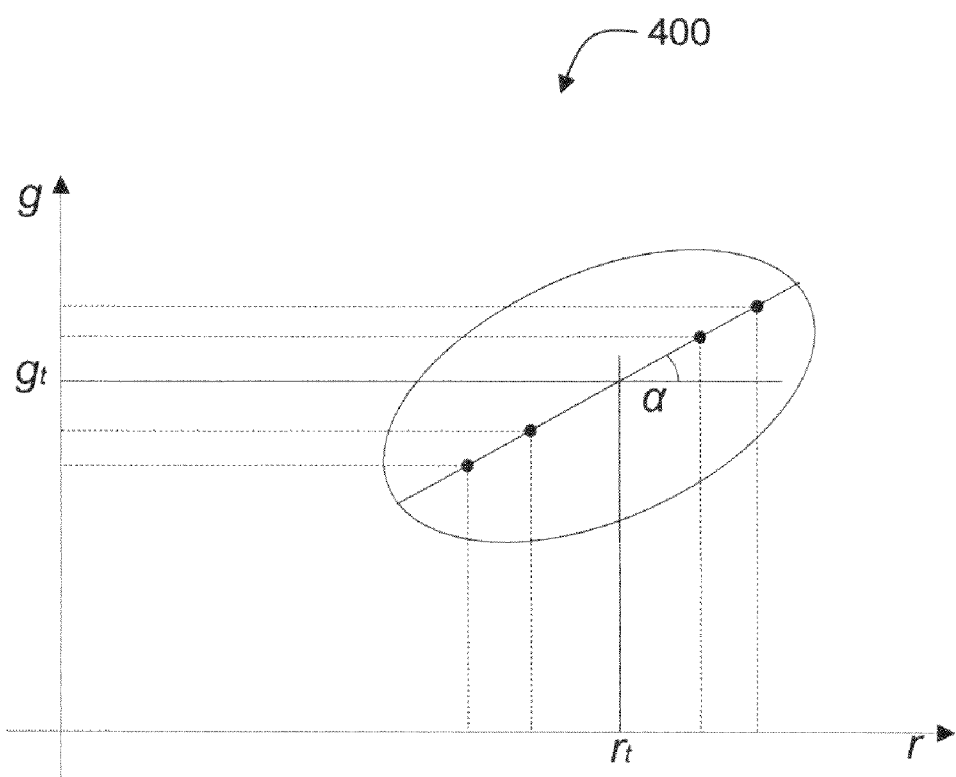
FIG. 4 depicts an elliptical Gaussian model for grouping pixels in the rg space.
Figure 5:
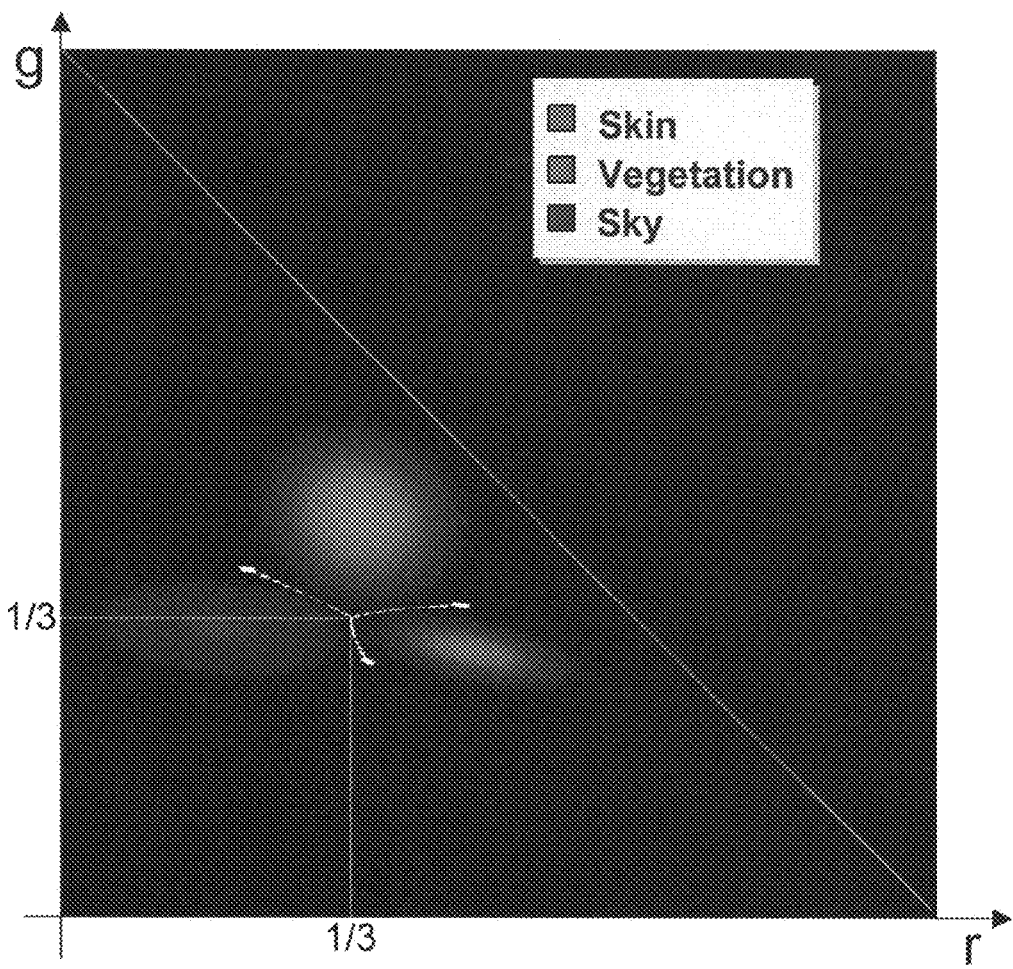
FIG. 5 is a graphical representation of an embodiment of a statistical classification model for three chromatic classes in the normalized two-dimensional domain rg.

FIG. 4 illustrates an embodiment 400 of the classification model with different color targets on the principal axis, used for obtaining a modulation of the selective color enhancement process. The closest color targets to the neutral axis (⅓, ⅓) will generate on the output image paler colors for this chromatic class, and the farthest targets from the neutral axis produce more saturated colors (FIG. 5).

It may happen that pixels on the neutral axis (⅓, ⅓) be corrected in a non-negligible manner because they are classified in a certain class. In this case, there may be, for example, the drawback of modifying a grey background in a slightly colored background. This undesired effect takes places when the membership level of a pixel on the neutral axis (⅓, ⅓) exceeds a certain value.

Tests carried out by the Applicant showed that when the membership level of the pixel (⅓, ⅓) to any class is smaller than 2%, this undesired correction is not perceivable. In order to prevent that pixels on the neutral axis (⅓, ⅓) be colored in a sensible manner with the color enhancement step, variances along the principal axis and along the orthogonal axis of each elliptical Gaussian function are calculated, and it is checked whether any membership level belongs to the neutral axis (⅓, ⅓) exceeds a certain threshold TH, that for example may be of 2%. If for any membership function this limit is surpassed, the respective variances along the principal axis and the orthogonal axis are reduced to keep substantially unchanged the shape ratio $\sigma_r/\sigma_g$ of the Gaussian function, such to satisfy the following relation:

$$G_c\left(\frac{1}{3}, \frac{1}{3}\right) < TH$$

After reviewing the specification, it will be evident to any skilled person that the value of the threshold TH may be different, depending on the intensity of the correction that it is tolerated for grey pixels.

FIG. 5 depicts a model with a plurality of classes on the normalized rg space for lighted skin, lighted vegetation and sky. The white dots are the borders of the classes.

In a sample embodiment of a method of classification of this invention, for the three classes cited above the following values were calculated by applying the analysis of the principal component to the set of natural RGB images:

| | mean R | mean G | Variance along the principal axis | Variance along the orthogonal axis | Direction of the principal axis (rad) |
|---|---|---|---|---|---|
| Pale skin | 0.409700 | 0.317200 | 0.003798 | 0.000335 | −0.203148 |
| Lighted vegetation | 0.3337200 | 0.413800 | 0.001839 | 0.001288 | −0.385927 |
| Sky | 0.252000 | 0.329600 | 0.005105 | 0.000740 | −0.068369 |

The membership level of each pixel to a certain class may be calculated using equation (3) for each chromaticity class, for example using software executed by a computer.

For a hardware implementation, in which generally a device capable of carrying out with sufficient precision the floating point calculations required in equation (3) is not available, it may be more convenient to store in a look-up table the values of the elliptical Gaussian membership functions in correspondence of various rg pairs. In an embodiment, the quantization step is not excessively coarse, which may help to avoid the phenomenon of generation of artificial borders arising again at the end of a color enhancement step that used the classification method.

In order to reduce the computational load and hardware requirements, the two-dimensional space of rg colors may be under-sampled. For example in an embodiment this space is subdivided into 64 intervals. Given that no pixel lays above the diagonal (r=255−g), the number of values to be stored in the look-up table is:

64×64/2=2048

Figure 6:
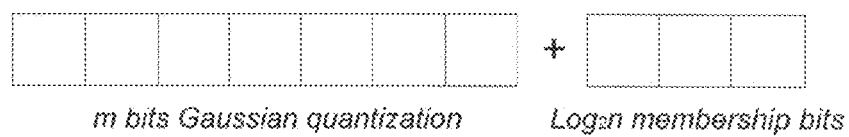
FIG. 6 illustrates schematically an embodiment of the bits used for encoding membership levels.
Figure 7A:
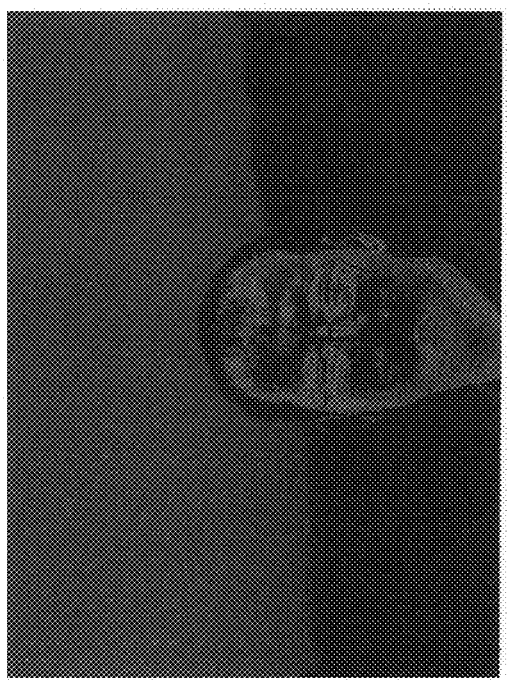
Figure 7B:
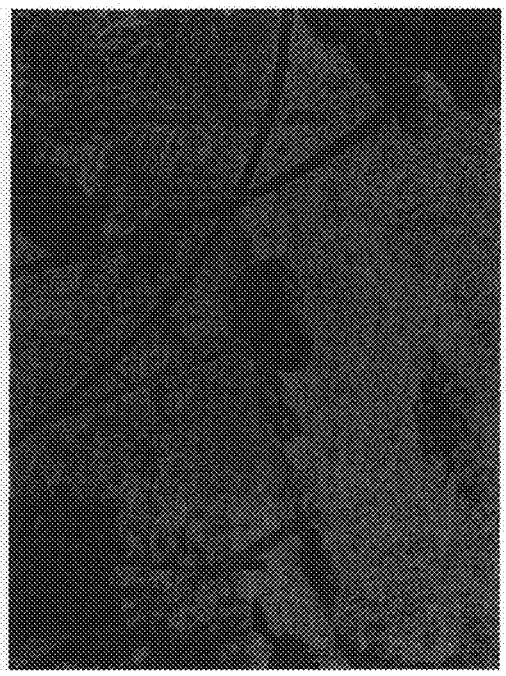
Figure 7C:
Figure 7D:
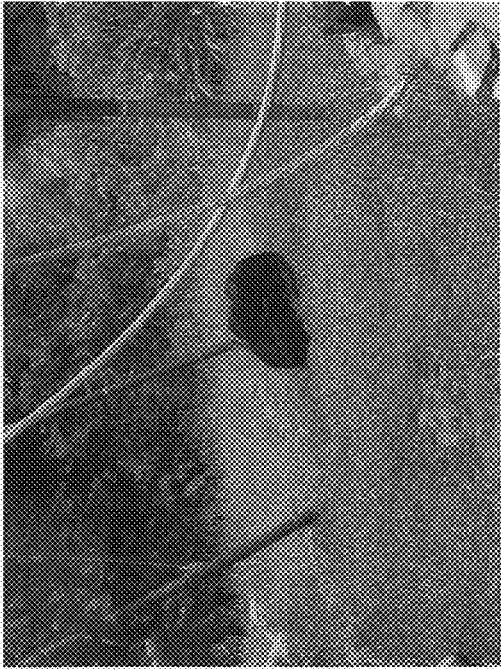

For each pair of rg values, the look-up table stores the class and the membership level for the corresponding pixel. The number of bits ("bit depth") may be established depending on the available memory space. For n representation classes with m bit quantization of the Gaussian model, m+$\log_2$n words are used for classifying a pixel, as shown in FIG. 6.

By means of the classification block, using the formula (3) or using the quantized values thereof stored in the look-up table, each pixel may be classified in the chromatic class corresponding to the largest membership level.

Figures from 7a to 7d depict examples of outputs of the chromatic classification process (7b and 7d) on natural images (7a and 7c). Membership masks are represented with mnemonic colors: blue for sky pixels, green for lighted vegetation pixels and red for lighted skin pixels. Moreover, the membership level L to each class has been used for modulating the intensity of the color of each pixel (supposing a 24 bit per pixel representation) according to the following formula:

$$C = L \cdot 255/2^m \quad (4)$$

wherein C is the intensity of the color (red for skin, green for vegetation, blue for sky), L is the value that expresses the membership level and m is the bit depth of the membership level.

The novel classification method of an embodiment may have the following advantages:
- it works in the two-dimensional normalized chromaticity space, that is preferable for characterizing statistically images;
- it may be carried out through a limited number of calculations and requires a limited memory capability;
- it does not require any spatial refinement operation;
- it does not require comparison with heuristically determined thresholds for classifying pixels, but provides the membership level and the relative membership class by accessing to a look-up memory or using formula (3).

The chromatic classification method of an embodiment may be conveniently used in an adaptive method of selective color enhancement. This adaptive enhancement method of an image may be carried out with the constraint of keeping unchanged the intensity of each pixel.

The block diagram of FIG. 8 describes a sample flow chart 800 of an embodiment for static images, relative to a RGB color model transformed 802 in the normalized rg two-dimensional space. FIG. 8 also illustrates function blocks of an embodiment of a corresponding system for performing the method. The results of the chromatic classification 804 are provided to a block 806 for collecting statistics of an image that calculates for each class the average of the chromaticity coordinates. A chromaticity distance ($\Delta r_c$, $\Delta g_c$) of each class from the position of the chosen chromaticity targets may be calculated 808. A color shift operation 810 is carried out keeping unchanged the intensity of the pixel and the intensity of the pixel and the statistics of the image is considered for displacing each chromatic cluster towards the desired coordinates, as shown hereinafter. For a pixel in RGB coordinates, the rg chromaticity components may be calculated using equations (1) and (2), and these values used for defining the membership class and the relative membership level.

For a pixel classified as belonging to the chromaticity class C, the color may be modified keeping unchanged the luminance of the pixel, according to the following equations:

$$R' = 3I(r + \Delta r_c)$$

$$G' = 3I(g + \Delta g_c)$$

$$B' = 3I[1 - (r + \Delta r_c) - (g + \Delta g_c)] \quad (5)$$

wherein $\Delta r_c$ and $\Delta g_c$ represent the distance of the chromatic cluster C from the chromatic targets of this class and/is the mean intensity of the RGB input pixel. The output RGB coordinates may be thus obtained through a linear combination of the input values and of the target levels, according to the following equations:

$$R_o = wR' + (1-w)R$$

$$G_o = wG' + (1-w)G$$

$$B_o = wB' + (1-w)B \quad (6)$$

wherein the weight w is the level that results from the operation of classification to the chromatic class C.

As stated hereinbefore, each pixel may be classified according to an embodiment of the method or system by using a Gaussian function defined in equation (3) (FIG. 9) or by storing quantized values of this Gaussian function in a look-up table (FIG. 10) and accessing to this table with the rg values of the normalized two-dimensional space that identify the color of the pixel.

FIG. 11 depicts a flow chart that illustrates how an embodiment of a method 1100 of chromatic classification may be used for enhancing the quality of color of a video image sequence. FIG. 11 also illustrates functional blocks of an embodiment of a system for chromatic classification. Differently from the diagram of FIG. 8, the distances $\Delta r$ and $\Delta g$, that represent the distance of the chromatic cluster C from the chromatic targets of the class, are calculated for the current image of the sequence by collecting statistical information of the previous images or of a subset thereof through the block N−1 FRAME STATS, outputting an enhanced image of the sequence.

FIG. 12 depicts a basic block diagram of an embodiment of a digital photo-camera 1200 that includes a block or module 1210 for implementing an embodiment of a method of chromatic classification. The photo-camera 1200 includes a sensor 1202, a bus system 1204, a pre-processing block 1206, an image generation pipeline block 1208, a chromatic classification block 1210, a codec 1212, and a DRAM 1224. As illustrated, the pre-processing block 1206 comprises an auto exposure block 1214, an auto focus block 1216, an auto white balance block 1218, and a noise level estimator 1220. The pre-processing block may comprise different or additional pre-processing blocks or modules, as illustrated by the dashed block 1222. The chromatic classification block may comprise, for example, one or more of the blocks illustrated in FIGS. 1 and 8-11.

FIG. 13 compares the results obtained by processing two input images (13a and 13e), enhancing their colors using chromatic targets with pale tones (13b and 13f), enhancing colors using an intermediate target of color saturation (13c and 13g) and using chromatic targets with large saturation color (13d and 13h).

FIG. 14 shows that an embodiment of the proposed method does not generate any evident spatial artifacts.

Embodiments of the systems and methods described herein may be implemented in a variety of ways, including as a combined system or as separate subsystems. Embodiments may be implemented as discrete circuitry, one or more microprocessors, digital signal processors (DSP), application-specific integrated circuits (ASIC), or the like, or as a series of instructions stored in a memory and executed by a controller, or various combinations of the above. In some embodiments, separately described sub-modules may be combined.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
chromatic classifying pixels of a digital image by,
transforming a chromatic domain of definition of pixels from a three-dimensional space into a respective two-dimensional normalized space;
defining a reference model of classification by analyzing a plurality of images of distinct types of subjects, generating distinct collections of samples with respective coordinates in the normalized two-dimensional space for each of a number of chromatic classes corresponding to real subjects; and
evaluating for each image pixel to be classified a membership class and a membership level within the membership class based on the reference model,
wherein said reference model is defined by a parametric membership function continuous on said normalized two-dimensional space for each of said chromatic classes, parameters of which are determined by processing the collection of two-dimensional samples of each of said chromatic classes, said chromatic classifying, transforming, defining and evaluating are performed by one or more configured processing devices, and wherein defining the reference model comprises calculating a mean position of clusters of samples on the normalized two-dimensional space, a variance in respect to a principal direction and to a direction orthogonal to said principal direction and a slope angle of said principal direction using a principal component analysis technique, thus obtaining an elliptical Gaussian model for each of said chromatic classes on said normalized two-dimensional space.

2. The method of claim 1 wherein said three-dimensional space is an RGB space and the respective normalized two-dimensional space is an rg space.

3. The method of claim 1 wherein for each membership class a relative membership value is obtained for a current pixel being processed, a maximum membership value being established in function of the respective membership class, and the membership level being determined in function of a maximum quantized value with a number of bits.

4. The method of claim 1, further comprising storing in array values of said reference model in correspondence of pairs of values in the normalized two-dimensional space, and of determining the membership level of each pixel by reading from the array a value corresponding to the pair that represents said pixel in the normalized two-dimensional space.

5. The method of claim 1, comprising steps of:
verifying whether levels of the membership functions in correspondence of a neutral axis are smaller than a threshold; and
reducing proportionally the variances of membership functions for which the verification of the previous step is not satisfied, such that a respective value of the membership level of said neutral axis is smaller than said threshold.

6. The method of claim 5 wherein said threshold is 2%.

7. A method, comprising:
chromatic classifying pixels of a digital image by,
transforming a chromatic domain of definition of pixels from a three-dimensional space into a respective two-dimensional normalized space;
defining a reference model of classification by analyzing a plurality of images of distinct types of subjects, generating distinct collections of samples with respective coordinates in the normalized two-dimensional space for each of a number of chromatic classes corresponding to real subjects; and
evaluating for each image pixel to be classified a membership class and a membership level within the membership class based on the reference model; and
storing in array values of said reference model in correspondence of pairs of values in the normalized two-dimensional space, wherein determining the membership level of each pixel includes reading from the array a value corresponding to the pair that represents said pixel in the normalized two-dimensional space, wherein:
said reference model is defined by a parametric membership function continuous on said normalized two-dimensional space for each of said chromatic classes, parameters of which are determined by processing the collection of two-dimensional samples of each of said chromatic classes, said chromatic classifying, transforming, defining and evaluating are performed by one or more configured processing devices, and
the stored values in said two-dimensional array are obtained through steps of:
on clusters of samples of said images of distinct types of subjects, calculating a mean position, a variance in respect to a principal direction, a variance in respect to a direction orthogonal to the principal direction and a slope angle of the principal direction;
generating values according to an elliptical Gaussian model in the normalized two-dimensional space; and
undersampling and quantizing the values obtained at a previous point and storing them in the two-dimensional array.

8. A method, comprising:
chromatic classifying pixels of a digital image by,
transforming a chromatic domain of definition of pixels from a three-dimensional space into a respective two-dimensional normalized space;
defining a reference model of classification by analyzing a plurality of images of distinct types of subjects, generating distinct collections of samples with respective coordinates in the normalized two-dimensional space for each of a number of chromatic classes corresponding to real subjects; and
evaluating for each image pixel to be classified a membership class and a membership level within the membership class based on the reference model;
generating a membership image of pixels of the digital image with the chromatic classes of the reference model;
defining a table of chromaticity target values for each chromatic class;

converting definition values of each pixel of an image to be processed from the chromatic definition domain to the respective normalized two-dimensional space;

calculating for each cluster of pixels belonging to a chromatic class a pair of statistic parameters;

calculating for each cluster a distance from a respective chromaticity target value;

determining for each pixel of the image belonging to a respective chromatic class, respective values in the chromatic definition domain corrected in function of coordinates of original values in the respective normalized two-dimensional space and of the distance of the relative cluster from a relative target color; and carrying out a modulated correction of a color of the pixel using a weighted linear combination of the values of the pixel and of said triplet of target values, wherein said reference model is defined by a parametric membership function continuous on said normalized two-dimensional space for each of said chromatic classes, parameters of which are determined by processing the collection of two-dimensional samples of each of said chromatic classes, said chromatic classifying, transforming, defining and evaluating are performed by one or more configured processing devices.

9. The method of claim 8 wherein said weighted linear combination is carried out using weights determined in function of the membership levels such that an intensity of pixels of the enhanced image is equal to an intensity of the corresponding pixel of the image to be enhanced.

10. A method of processing pixels in a digital image, the method comprising:

generating, using one or more configured processing devices, a membership image of pixels of the digital image based on chromatic classes of a reference model and membership levels of pixels of the digital image in the chromatic classes of the reference model;

defining, using the one or more configured processing devices, a table of chromaticity target values for each chromatic class;

calculating, using the one or more configured processing devices, for each cluster of pixels belonging to a chromatic class a pair of statistic parameters;

calculating, using the one or more configured processing devices, for each cluster a distance from a respective chromaticity target value;

determining, using the one or more configured processing devices, for each pixel of the image belonging to a respective chromatic class, respective values in the chromatic definition domain corrected in function of coordinates of original values in the respective normalized two-dimensional space and of the distance of the relative cluster from a relative target color; and carrying out, using the one or more configured processing devices, a modulated correction of a color of the pixel using a weighted linear combination of the values of the pixel and of said triplet of target values.

11. The method of claim 10 wherein said weighted linear combination is carried out using weights determined in function of the membership levels such that an intensity of pixels of the enhanced image is equal to an intensity of the corresponding pixel of the image to be enhanced.

* * * * *